United States Patent [19]

Furukawa et al.

[11] 4,385,151

[45] May 24, 1983

[54] COMPOSITION CONTAINING ISOPRENE POLYMER

[75] Inventors: Hiroshi Furukawa, Kobe; Yuichi Saito, Nishinomiya; Akio Imai, Ichihara; Keisaku Yamamoto, Ichihara; Tomoaki Seki, Ichihara; Nobuyuki Yoshida, Ichihara, all of Japan

[73] Assignees: Sumitomo Rubber Industries, Ltd., Hyogo; Sumitomo Chemical Co., Ltd., Osaka, both of Japan

[21] Appl. No.: 324,548

[22] Filed: Nov. 24, 1981

[30] Foreign Application Priority Data

Dec. 5, 1980 [JP] Japan .................................. 55/172194
Jan. 26, 1981 [JP] Japan .................................. 56/10537

[51] Int. Cl.$^3$ .............................................. C08K 3/06
[52] U.S. Cl. ..................................... 524/420; 524/78; 524/322; 526/181; 526/337; 526/340.2
[58] Field of Search ......................... 526/340.2, 337; 524/420, 322, 78

[56] References Cited

U.S. PATENT DOCUMENTS 3,669,943  6/1972  Komatsu et al. ................. 526/340.2

*Primary Examiner*—Stanford M. Levin
*Attorney, Agent, or Firm*—Armstrong, Nikaido, Marmelstein & Kubovcik

[57] ABSTRACT

A rubber composition containing an isoprene homopolymer or copolymer having a glass transition temperature of not less than −50° C. and a Mooney viscosity of 20 to 120. The composition can provide a cured rubber having a high wet road gripping force and a small dynamic heat generating characteristic, and is very suitable for use in tires of automobiles.

1 Claim, 2 Drawing Figures

COMPOSITION CONTAINING ISOPRENE POLYMER

BACKGROUND OF THE INVENTION

The present invention relates to a composition containing isoprene homopolymer or a butadiene-isoprene copolymer, and more particularly to a rubber composition containing as a rubber component an isoprene polymer having a glass transition temperature higher than a specific temperature.

Hitherto, many kinds of conjugated diene polymers are known, and in particular, isoprene polymers and butadiene polymers synthesized by using the so-called Ziegler catalyst and butadiene polymers synthesized by using an organolithium catalyst have been manufactured on an industrial scale. These polymers are characterized by their modes of microstructure, and it is known that they are polymers having a high cis content or a high cis and trans content. It is also known that natural rubber is an isoprene polymer having a high cis content. These natural and synthetic rubbers have been employed for various purposes such as tires.

In recent years, safety in running and low fuel consumption of automobiles have been increasingly demanded because of development of a superhighway system and a rise of energy cost. Consequently, there has been desired the improvement for the characteristics of automobile tires, particularly the force of gripping a wet road and the rolling resistance. Although the characteristics of tires vary depending on the structure of tire and the characteristics of raw materials of tire, in particular the wet road gripping force and the dynamic characteristics such as energy losses due to dynamic heat generation are greatly affected by the characteristics of a rubber material.

The above-mentioned isoprene and butadiene polymers having a high cis content which are presently used as a rubber component of compositions for tires, have a feature that dynamic heat generation is small. However, they have a drawback that the braking characteristics which are another important performance required in tires are bad, and in particular are remarkably lacking in the wet skid resistance which indicates the wet road gripping force. In order to cover up the drawback, there has been adopted a manner using a rubber blend. For instance, since cis-polybutadiene rubber is superior in the dynamic heat generation characteristic to isoprene rubber, and since a styrene-butadiene rubber having a high glass transition temperature has a good wet skid resistance though being large in dynamic heat generation, there has been employed as a rubber component of a composition for tires a blend of the cis-polybutadiene rubber and the styrene-butadiene rubber in a suitable proportion, into which natural rubber or a cis-polyisoprene rubber may be further incorporated, as occasion demands. However, this manner increases the dynamic heat generation, thus resulting in increase of the rolling resistance of tires, though the wet skid resistance is improved to some extent. There has not been provided a rubber composition which provides a rubber having a wet skid resistance as high as the styrene-butadiene rubber and a dynamic heat generation characteristic as low as the cis-polybutadiene rubber. It is the present condition in this industry that unsatisfactory rubber compositions are used, and rubber compositions showing a high wet skid resistance and a small dynamic heat generation characteristic have been strongly desired.

SUMMARY OF THE INVENTION

In accordance with the present invention, there is provided a rubber composition containing as a rubber component an isoprene polymer having a glass transition temperature of not less than −50° C. and a Mooney viscosity ML1+4(121° C.) of 20 to 120. The composition of the invention is curable in a usual manner. The cured product has excellent both characteristics of wet skid resistance and dynamic heat generation, and is very suitable for use in tires of automobiles.

DETAILED DESCRIPTION

The composition of the present invention is rubber compositions obtained by mixing the specific isoprene polymer with usual rubber additives such as carbon black, sulfur, curing accelerator and antioxidant in a usual manner, and comprehends those containing an extender in an amount not impairing the objects of the invention.

The isoprene polymers used as a rubber component in the present invention are isoprene homopolymer and a butadiene-isoprene copolymer which have a glass transition temperature of not less than −50° C. and a Mooney viscosity ML1+4(121° C.) of 20 to 120.

Figure 1:
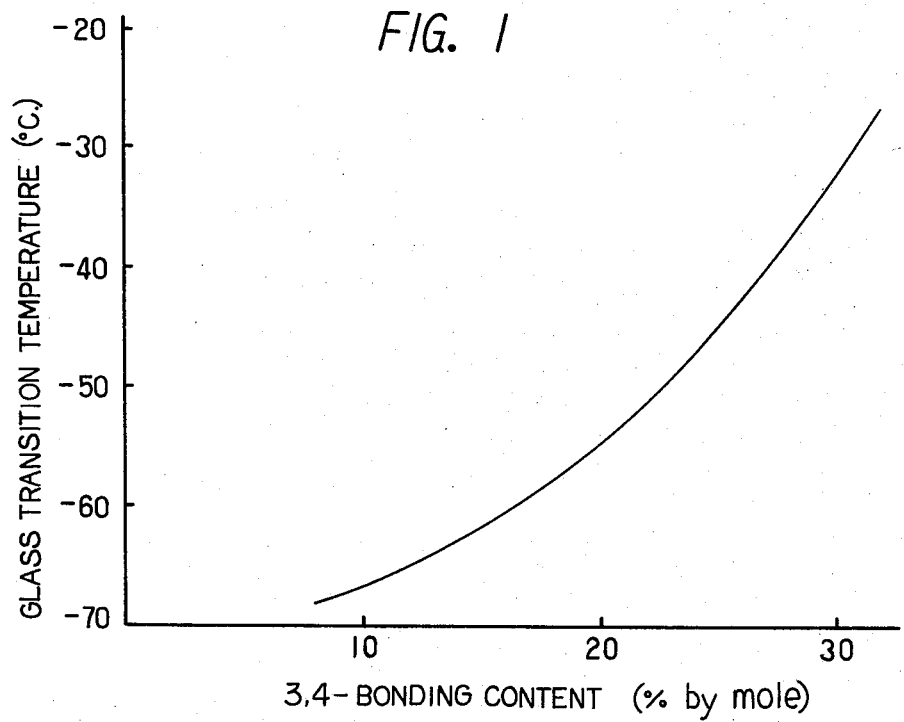
FIG. 1 is a graph showing the relationship between the glass transition temperature of isoprene homopolymer and the 3,4-bonding content in the polymer.

In general, the glass transition temperature of a conjugated diene polymer varies depending on the microstructure of the polymer. For instance, the glass transition temperature of a high-cis-polyisoprene which is presently put on the market is in the neighborhood of −75° C., and the glass transition temperature of a high-cis-polybutadiene is in the neighborhood of −108° C. The glass transition temperature of the isoprene or butadiene polymer rises with the increase of the content of 1,2-bonding or 3,4-bonding in the polymer. FIG. 1 is a graph showing the relationship between the glass transition temperature of isoprene homopolymer and the 3,4-bonding content in the polymer. In case of the isoprene homopolymer, the polymers having a glass transition temperature of not less than −50° C. are those having a 3,4-bonding content of at least about 23% by mole.

The isoprene homopolymers and copolymers having a glass transition temperature of not less than −50° C. can be prepared by a polymerization process using an alkali metal or an organometallic compound of an alkali metal as a polymerization initiator, which is known as a living anionic polymerization process. The polymerization is carried out in a polymerization solvent, e.g. a nonpolar hydrocarbon solvent such as hexane, heptane, cyclohexane or benzene, in the presence of an alkali metal such as sodium or potassium or an organometallic compound of the alkali metals as an initiator, or in the presence of a combined initiator system consisting of lithium metal or an organolithium compound and a Lewis base such as ethers or tertiary amines.

The use of the combined initiator system is particularly preferred in the stability of the polymerization reaction. In that case, with the increase of the proportion of the Lewis base used to the lithium or organolithium compound used, the contents of 1,2-bonding and 3,4-bonding in the produced polymer increase, consequently the glass transition temperature of the polymer rises.

In case of preparing the butadiene-isoprene copolymer, butadiene and isoprene can be employed in any proportions. The higher the proportion of isoprene, the higher the polymerization rate and also the glass transition temperature of the produced copolymer tends to become higher. Isoprene is used in an amount of more than 5%, preferably more than 20% by weight, based on the whole monomers used. In the copolymerization of butadiene and isoprene using the initiator system as mentioned above, it is known that when the both monomers are added simultaneously to the polymerization system, butadiene first polymerizes in preference to isoprene owing to the difference in the reactivity and the isoprene units gradually increase according to the ratio of the concentrations of the residual monomers, that is to say, the so-called tapered copolymer is produced. It is also known that the non-tapered copolymer is obtained by adding butadiene to the polymerization system in portions or continuously in order to prevent the production of the tapered copolymer. In the present invention, so long as the copolymer has a glass transition temperature of not less than −50° C., any manners of adding the monomers are adoptable and any copolymers obtained are usable as a rubber component of the composition of the invention.

The polymerization temperature is selected from the same temperature range as in a usual solution polymerization system, e.g. from 20° to 200° C. In that case, attention should be paid to the relation between the polymerization temperature and the microstructure content of the produced polymer. That is to say, in case of using a combined catalyst system of a Lewis base and a lithium initiator, if the ratio thereof is constant, the contents of 1,2-bonding and 3,4-bonding tend to decrease with the rise of the polymerization temperature. Therefore, in order to obtain an isoprene polymer having a desired glass transition temperature, it is preferable to carry out the polymerization with paying attention to the proportion between a Lewis base and a lithium initiator and the polymerization temperature, and further, in case of a butadiene-isoprene copolymer, to the monomer ratio.

The rubber composition of the present invention containing as a rubber component an isoprene polymer having a glass transition temperature of not less than −50° C. can provide a rubber having excellent properties such that the dynamic heat generation is as low as a high-cis-polybutadiene rubber composition and the wet skid resistance is higher than a styrene-butadiene rubber composition. When the glass transition temperature of the isoprene polymer is lower than −50° C., the wet skid resistance is lowered.

It is necessary that the isoprene polymer used in the present invention has a molecular weight such that the Mooney viscosity measured at 121° C. falls within the range of 20 to 120. When the Mooney viscosity of the polymer is less than 20, the dynamic heat generation is increased. When the Mooney viscosity is more than 120, the supply of the polymer to a processing machine becomes difficult in the preparation of the composition, and consequently the compoundability becomes bad.

The composition of the present invention is prepared by admixing the isoprene polymer having the specific glass transition temperature and Mooney viscosity as mentioned above with usual rubber additives such as 20 to 150 parts of carbon black, less than 100 parts of a process oil, 0.5 to 5 parts of sulfur, 0.1 to 10 parts of curing accelerator and less than 6 parts of an antioxidant, per 100 parts by weight of the polymer, by employing a usual rubber mixing machine. The composition of the invention can be cured in a usual manner by employing a usual curing apparatus to provide a cured product.

The present invention is more specifically described and explained by means of the following Examples, in which all parts are by weight. These Examples are intended to illustrate the invention and are not to be construed to limit the scope of the invention. Also, it is to be understood that various changes and modifications may be made in the invention without departing from the spirit and scope thereof.

In the following Examples, measurements of physical properties were made as follows:

Mooney viscosity of polymer

By employing a Mooney viscometer set at 121° C., a polymer was preheated for 1 minute, and after 4 minutes, the torque value was read. (ML, 1+4, 121° C.)

Glass transition temperature of polymer

The measurement was made by raising the temperature from −100° C. to +20° C. at a rate of 20° C./minute employing a differential scanning calorimeter made by E. I. duPont de Nemours & Co. The transition temperature was determined from the position of the transition heat absorption peak.

Content of microstructure and composition of copolymer

Infrared absorption spectrum of a polymer was measured by a rock salt plate method employing a spectrophotometer made by Hitachi, Ltd. The contents of microstructures and the ratio of butadiene units and isoprene units in an isoprene copolymer were calculated according to a method of Kofman et al, as disclosed in V. L. Kofman et al, Polymer Sci. USSR. Vol. 21, No. 7, 1676(1979).

Wet skid resistance

The wet skid resistance was measured by employing a portable skid resistance tester made by Stanley with respect to a sheet having a thickness of 6.5 mm. obtained by press-curing a rubber composition. An asphalt surface to which water of 20° C. was sprayed was employed as a contact road surface.

Dynamic heat generation

By employing the above press-cured sheet and an automatic Goodrich flexometer, the measurement was made under conditions of 20 pounds in static loading, 1,800 c.p.m. in vibration, 75° C. in temperature and 0.2 inch in stroke. The temperature rise after 14 minutes was recorded.

EXAMPLES 1 TO 4

Isoprene homopolymers having a glass transition temperature of not less than −50° C. were prepared at 50° C. by a living anionic polymerization process employing isoprene, n-hexane as a polymerization medium and a combined catalyst system of tetrahydrofuran and n-buthyllithium initiator in amounts shown in Table 1, respectively. The Mooney viscosity, glass transition temperature and microstructure of the prepared polymers are also shown in Table 1.

Compositions were prepared by employing the thus obtained polymers. The polymers were compounded with 60 parts of carbon black, 20 parts of linseed oil, 5 parts of zinc white, 2 parts of stearic acid, 2 parts of a curing accelerator and 1.6 parts of sulfur, respectively, per 100 parts of the polymer, and milled by 8 inch mixing rolls to give compositions.

The compositions were press-cured at 150° C. by employing a steam press of 150 tons to give cured products used as test pieces. The physical properties of the thus press-cured products were measured.

The results are shown in Table 1.

COMPARATIVE EXAMPLES 1 TO 3

The procedures of Examples 1 to 4 were repeated except that isoprene homopolymers having a glass transition temperature of less than −50° C. were prepared and employed as a rubber component.

The results are shown in Table 1.

From Table 1, it is clear that the compositions of isoprene polymers having a low glass transition temperature are inferior in the wet skid resistance.

COMPARATIVE EXAMPLES 4 AND 5

A rubber compositions were prepared and press-cured in the same manner as in Examples 1 to 4 except that there were employed as rubber components a blend of 75 parts of a styrene-butadiene rubber (SBR) (commercial name "SBR 1500" made by Sumitomo Chemical Co., Ltd.) and 25 parts of a cis-1,4-polybutadiene rubber (BR) (commercial name "JSR-BR01" made by Japan Synthetic Rubber Co., Ltd.) (Comparative Example 4), and a high-cis-polyisoprene rubber (cis-IR) (Commercial name "JSR-2200" made by Japan Synthetic Rubber Co., Ltd.) (Comparative Example 5).

The results are shown in Table 1.

As is clear from Table 1, these compositions are inferior in that the dynamic heat generation is large or the wet skid resistance is low.

TABLE 1

|  | Ex. 1 | Ex. 2 | Ex. 3 | Ex. 4 | Com. Ex. 1 | Com. Ex. 2 | Com. Ex. 3 | Com. Ex. 4 | Com. Ex. 5 |
|---|---|---|---|---|---|---|---|---|---|
| Polymerization formulation (part) |  |  |  |  |  |  |  | (SBR/ BR blend) | (Cis-IR) |
| n-Hexane | 500 | 500 | 500 | 500 | 500 | 500 | 500 |  |  |
| Isoprene | 100 | 100 | 100 | 100 | 100 | 100 | 100 |  |  |
| Tetrahydrofuran | 18 | 11 | 7 | 4 | 2 | 1 | 0 |  |  |
| n-Buthyllithium | 0.014 | 0.021 | 0.018 | 0.023 | 0.021 | 0.026 | 0.022 |  |  |
| Physical properties of polymer |  |  |  |  |  |  |  |  |  |
| Mooney viscosity ML1 + 4(121° C.) | 72 | 58 | 65 | 49 | 60 | 42 | 60 | — | 67 |
| Glass transition temp. (°C.) | −18 | −26 | −35 | −43 | −55 | −67 | −70 | — | −74 |
| Microstructure (% by mole) |  |  |  |  |  |  |  |  |  |
| 3,4-Bonding | 35 | 32 | 29 | 26 | 20 | 10 | 5 | — | 2 |
| 1,2-Bonding | 7 | 5 | 4 | 3 | 2 | 2 | 1 | — | 0 |
| Trans-1,4-bonding | 0 | 0 | 0 | 0 | 0 | 0 | 0 | — | 0 |
| Cis-1,4-bonding | 58 | 63 | 67 | 71 | 78 | 88 | 94 | — | 98 |
| Physical properties of cured product |  |  |  |  |  |  |  |  |  |
| Wet skid resistance | 67 | 66 | 63 | 62 | 58 | 57 | 54 | 58 | 55 |
| Dynamic heat generation (temp. rise) (°C.) | 24.3 | 25.3 | 23.8 | 25.6 | 24.8 | 26.8 | 25.1 | 30.2 | 24.5 |

Figure 2:
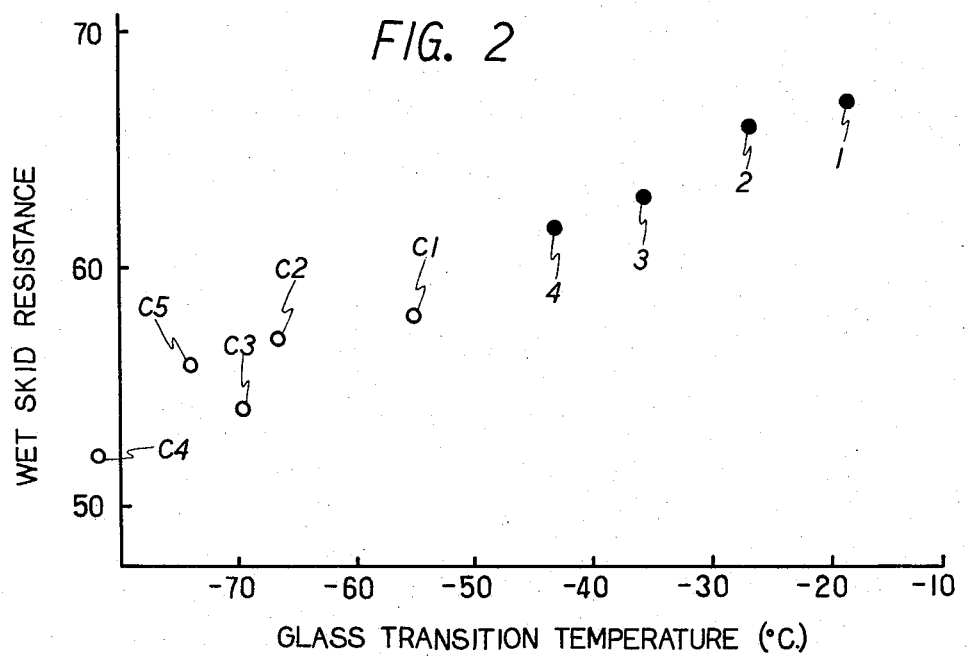
FIG. 2 is a graph showing the relationship between the wet skid resistance and the glass transition temperature of isoprene homopolymer.

The relationship between the wet skid resistance and the glass transition temperature of polymer is shown in FIG. 2 in which numerals 1, 2, 3 and 4 are for Examples 1, 2, 3 and 4, respectively, and numerals C1, C2, C3, C4 and C5 are for Comparative Examples 1, 2, 3, 4 and 5, respectively.

From Table 1 and FIG. 2, it is clear that the composition of the present invention can provide a rubber having a higher wet skid resistance and the same or improved dynamic heat generation characteristic as compared with a composition of an isoprene polymer having a glass transition temperature of less than −50° C. Also, comparing the composition of the invention with the composition of Comparative Example 4 containing a SBR/cis-1,4-BR blend as presently used in this industry, it is understood that the composition of the invention is improved in both the wet skid resistance and the cynamic heat generation.

EXAMPLES 5 TO 8 AND COMPARATIVE EXAMPLES 6 TO 8

Butadiene-isoprene copolymers were prepared in the same manner as in Examples 1 to 4 according to the formulations shown in Table 2. By employing the isoprene copolymers, compositions were prepared and press-cured in the same manner as in Examples 1 to 4.

The results are shown in Table 3.

TABLE 2

|  | Ex. 5 | Ex. 6 | Ex. 7 | Ex. 8 | Com. Ex. 6 | Com. Ex. 7 | Com. Ex. 8 |
|---|---|---|---|---|---|---|---|
| Polymerization formulation (part) |  |  |  |  |  |  |  |
| n-Hexane | 500 | 500 | 500 | 500 | 500 | 500 | 500 |
| Butadiene | 50 | 50 | 70 | 30 | 50 | 70 | 30 |
| Isoprene | 50 | 50 | 30 | 70 | 50 | 30 | 70 |
| Tetrahydrofuran | 9 | 14 | 18 | 11 | 0.7 | 0 | 0 |
| n-Buthyllithium | 0.015 | 0.020 | 0.018 | 0.020 | 0.015 | 0.018 | 0.020 |

TABLE 3

|  | Ex. 5 | Ex. 6 | Ex. 7 | Ex. 8 | Com. Ex. 6 | Com. Ex. 7 | Com. Ex. 8 |
|---|---|---|---|---|---|---|---|
| Physical properties of polymer |  |  |  |  |  |  |  |
| Mooney viscosity ML1 + 4(121° C.) | 70 | 61 | 66 | 60 | 71 | 65 | 59 |
| Glass transition temp. (°C.) | −45 | −40 | −38 | −41 | −61 | −91 | −79 |
| Composition of copolymer |  |  |  |  |  |  |  |
| Butadiene/isoprene (weight ratio) | 50.8/49.2 | 51.2/48.8 | 69.6/30.4 | 29.5/70.5 | 49.7/50.3 | 69.2/30.8 | 30.1/69.9 |
| Microstructure (% by mole) |  |  |  |  |  |  |  |
| Content in whole butadiene units |  |  |  |  |  |  |  |
| 1,2-Bonding | 56 | 68 | 72 | 50 | 37 | 10 | 10 |
| Cis-1,4-bonding | 18 | 9 | 8 | 21 | 26 | 38 | 38 |
| Trans-1,4-bonding | 26 | 21 | 20 | 29 | 37 | 52 | 52 |
| Content in whole isoprene units |  |  |  |  |  |  |  |
| 1,2-Bonding | 7 | 8 | 8 | 5 | 4 | 0 | 0 |
| 3,4-Bonding | 40 | 42 | 44 | 36 | 28 | 6 | 6 |
| Cis-1,4-bonding | 53 | 50 | 48 | 59 | 68 | 94 | 94 |
| Trans-1,4-bonding | 0 | 0 | 0 | 0 | 0 | 0 | 0 |
| Physical properties of cured product |  |  |  |  |  |  |  |
| Wet skid resistance | 60 | 62 | 64 | 63 | 57 | 48 | 52 |
| Dynamic heat generation |  |  |  |  |  |  |  |
| (temp. rise) (°C.) | 23.8 | 26.3 | 25.4 | 24.7 | 24.5 | 26.2 | 27.3 |

As is clear from Table 3, the composition of the present invention has excellent features that the wet skid resistance is high and the dynamic heat generation is small. On the other hand, a composition of an isoprene copolymer having a low glass transition temperature is inferior in the wet skid resistance.

EXAMPLES 9 AND 10 AND COMPARATIVE EXAMPLE 9

The procedures of Examples 1 to 4 were repeated except that there were employed as rubber components butadiene-isoprene copolymers having a glass transition of about −40° C. and a Mooney viscosity within the range of 20 to 120 (Examples 9 and 10) and a butadiene-isoprene copolymer having a glass transition temperature of about −40° C., but having a Mooney viscosity of 18 (Comparative Example 9).

The results are shown in Table 4.

The composition of Comparative Example 9 is inferior in that the dynamic heat generation is large.

TABLE 4

|  | Ex. 9 | Ex. 10 | Com. Ex. 9 |
|---|---|---|---|
| Physical properties of polymer |  |  |  |
| Glass transition temperature (°C.) | −42 | −40 | −41 |
| Mooney viscosity ML1 + 4(121° C.) | 90 | 50 | 18 |
| Physical properties of cured product |  |  |  |
| Wet skid resistance | 61 | 62 | 60 |
| Dynamic heat generation |  |  |  |
| (temp. rise) (°C.) | 22.0 | 27.2 | 40.2 |

What we claim is:

1. A rubber composition comprising 100 parts by weight of an isoprene homopolymer or butadiene-isoprene copolymer having a glass transition temperature of not less than −50° C. and a Mooney viscosity ML1+4(121° C.) of 20 to 120, 20 to 150 parts by weight of carbon black, less than 100 parts by weight of a process oil, 0.5 to 5 parts by weight of sulfur, 0.1 to 10 parts by weight of a curing accelerator and less than 6 parts by weight of an antioxidant.

* * * * *